United States Patent
Jayaraman et al.

[11] Patent Number: 5,860,480
[45] Date of Patent: Jan. 19, 1999

[54] METHOD AND APPARATUS FOR DETERMINING PITCH AND GROUND SPEED OF AN EARTH MOVING MACHINES

[75] Inventors: Gangadhar Jayaraman, Peoria; Kenneth L. Stratton, Dunlap; Eric F. Lee, Peoria Heights; Karl W. Kleimenhagen, Peoria, all of Ill.; Howard J. Chizeck, Cleveland Heights, Ohio

[73] Assignee: Caterpillar Inc., Peoria, Ill.

[21] Appl. No.: 835,889

[22] Filed: Apr. 8, 1997

[51] Int. Cl.⁶ .............................. G05D 1/02; A01D 41/02
[52] U.S. Cl. .......................................... 172/2; 364/424.07
[58] Field of Search ............................ 172/2, 4, 4.5, 7, 172/9, 826; 364/424.07, 449, 450; 342/63, 64, 65, 357

[56] References Cited

U.S. PATENT DOCUMENTS

| | | | |
|---|---|---|---|
| 4,786,908 | 11/1988 | Runnalls | 342/63 |
| 4,934,985 | 6/1990 | Strubbe | 460/4 |
| 5,528,843 | 6/1996 | Rouke | 37/348 |
| 5,546,799 | 8/1996 | Parker | 364/565 X |
| 5,560,431 | 10/1996 | Stratton | 172/2 |

*Primary Examiner*—Thomas B. Will
*Assistant Examiner*—Robert Pezzuto
*Attorney, Agent, or Firm*—David M. Masterson; Kevin M. Kercher

[57] ABSTRACT

The present invention is directed toward estimating certain operating parameters of an earth moving machine. Advantageously, the present invention utilizes a Kalman filter to estimate the pitch, pitch rate and ground speed of the earth moving machine as a function of the sensed pitch and ground speed signals. By estimating the pitch and ground speed, the present invention overcomes the prior problems of sensing signal noise and bias. The present invention overcomes these problems by combining pitch, pitch rate and ground speed, and determining an estimate of pitch and ground speed by using a sensor measurement model, machine process model and Kalman filter update equations.

14 Claims, 4 Drawing Sheets

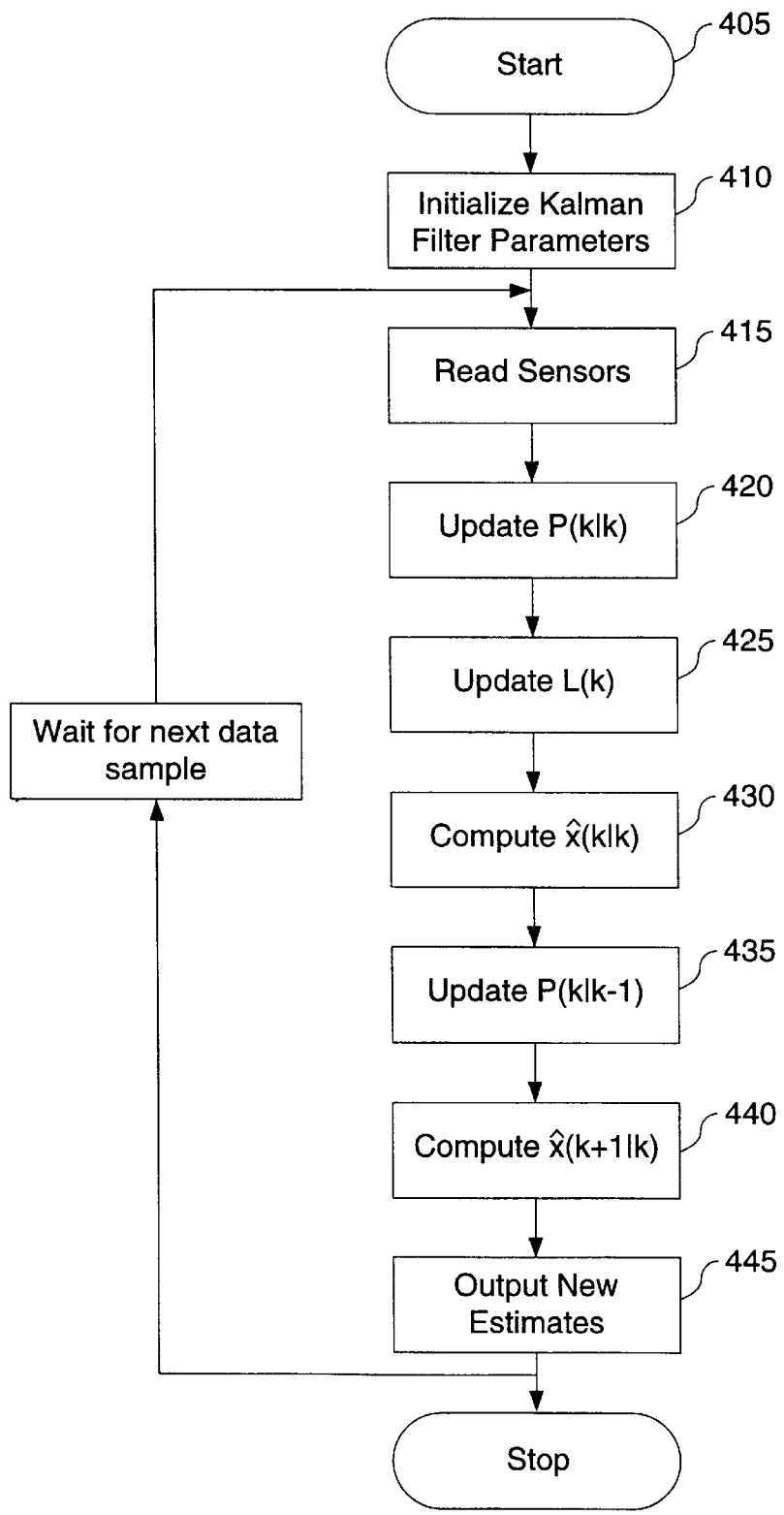

METHOD AND APPARATUS FOR DETERMINING PITCH AND GROUND SPEED OF AN EARTH MOVING MACHINES

TECHNICAL FIELD

This invention relates generally to determining the pitch and ground speed of an earth moving machine and, more particularly, to determining the pitch and ground speed using a Kalman filter.

BACKGROUND ART

It is desirous for an implement of an earth moving machine, such as a bulldozer, to be operated in a manner that results in the greatest productivity. Oftentimes, manual control of an earth moving implement, such as a bulldozer blade, is inefficient. Consequently, modern day earth moving machines include electronic sensors that deliver signals indicative of various operational parameters of the earth moving machine to microprocessor based controls in order to automatically control the implement.

Unfortunately, the sensors produce signals that are corrupted with noise and bias. Thus, many times the sensed signal does not represent a precise measurement.

The present invention is directed toward overcoming one or more of the problems as set forth above.

DISCLOSURE OF THE INVENTION

In one aspect of the present invention, a method for determining pitch and ground speed of an earth moving machine is disclosed. The method determines a set of equations that model a set of operating parameters of the earth moving machine, senses a plurality of operating parameters on the earth moving machine, and produces a set of sensed parameter signals. Responsively, a pitch estimate and a ground speed estimate is determined by using least-means-squared estimation techniques.

BRIEF DESCRIPTION OF THE DRAWINGS

For a better understanding of the present invention, reference may be made to the accompanying drawings in which:

FIG. 4 illustrates a flowchart of a software program of the Kalman filter.

BEST MODE FOR CARRYING OUT THE INVENTION

Figure 1:
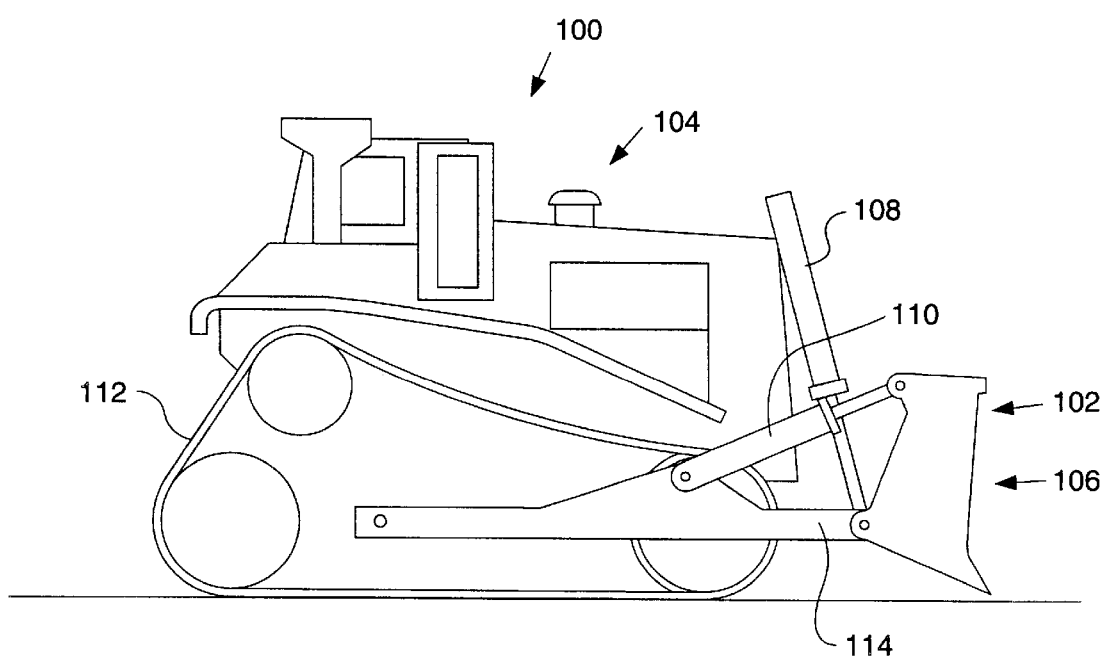
FIG. 1 illustrates a planar view of an earth moving machine.

With reference to the drawings, FIG. 1 shows a planar view of an earth moving machine 100 having an earth moving implement 102. The earth moving implement 102 is utilized to move earth or soil.

For illustrative purposes, the earth moving machine 100 is shown as a track-type bulldozer 104 and the earth moving implement 102 is shown as a bulldozer blade 106. While the invention is described in conjunction with a bulldozer, it is intended that the invention also be used on other types of earth moving machines and earth moving implements, such as other tracked and wheeled machines.

The bulldozer 104 includes hydraulic lift actuators 108 for raising and lowering the blade 106 and hydraulic tilt actuators 110 for tilting or tipping the blade 106. Although not shown in FIG. 1, the bulldozer 104 preferably includes two lift actuators 108 and two tilt actuators 110, one on each side of the bulldozer blade 106. As shown, the bulldozer 104 includes a set of tracks 112 to propel the bulldozer 104 and a draft arm 114 to push the blade 106. Thus, power applied to the blade 106 via the hydraulic lift actuators 108 during earth moving operations causes the blade 106 to push and carry the soil.

Figure 2:
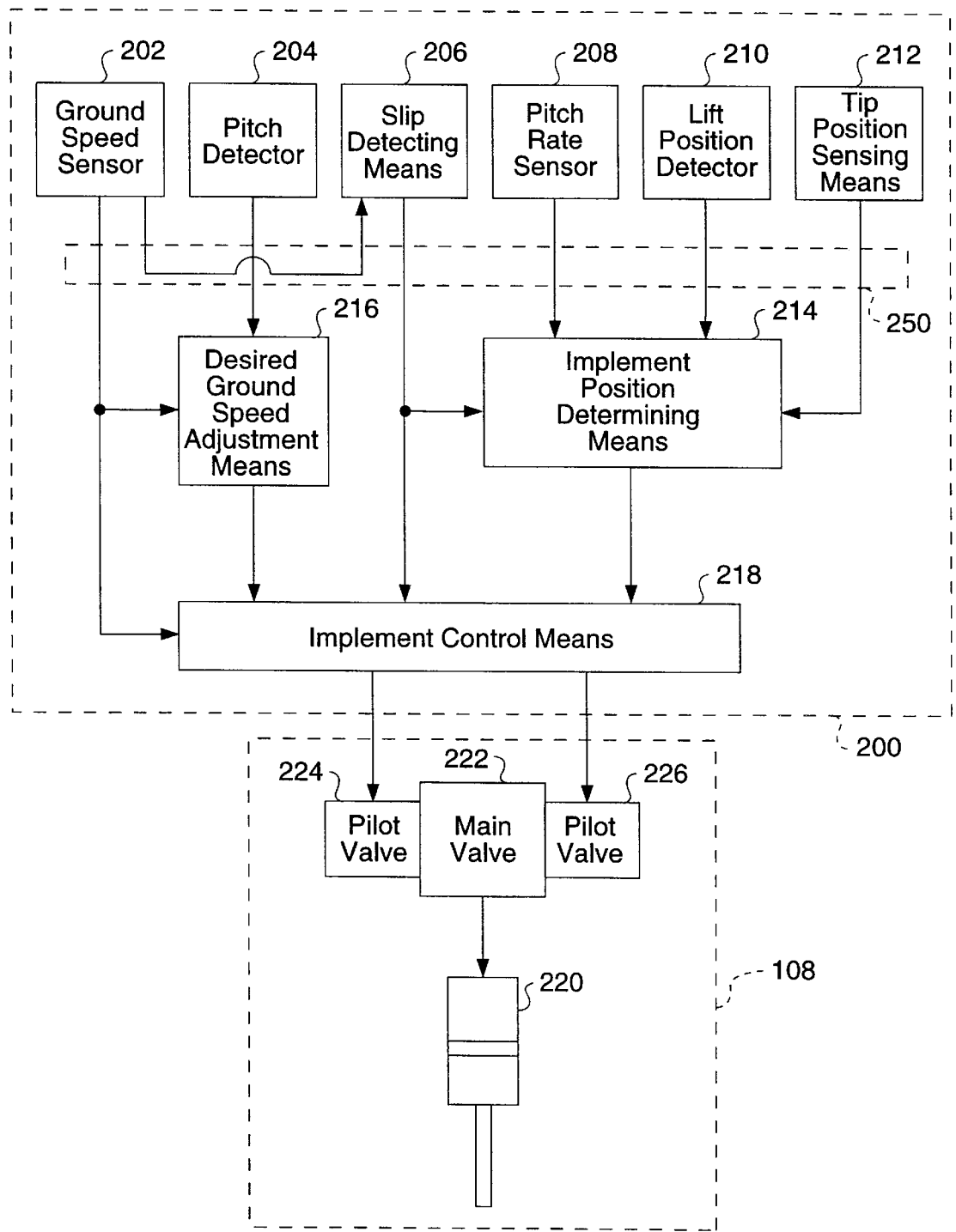
FIG. 2 illustrates a block diagram of an automatic control system to control an earth moving implement.

Reference is now made to FIG. 2, which shows a block diagram of one embodiment of an automatic control system 200. In the illustrated embodiment, the automatic control system 200 is adapted to control the lift actuator 18 in order to control the blade 106. For the purposes of illustration, the lift actuator 108 depicted in the block diagram of FIG. 2 is shown as a single hydraulic lift cylinder 220 with a single main valve 222 and two pilot valves 224,226.

The automatic control system 200 includes a ground speed sensor 202 that senses the ground speed of the earth moving machine 100 and responsively produces a ground speed signal. The ground speed sensor 202 is suitably positioned on the bulldozer 104 and includes, for example, a non-contacting ultrasonic or Doppler radar type sensor.

The automatic control system 200 also includes a pitch detector 204 for determining the pitch or inclination upon which the bulldozer 104 is operating and responsively producing a pitch signal. In the preferred embodiment, the pitch detector 204 includes a pitch sensor of the pendulum type that utilizes capacitive or resistive fluids. Such a sensor, however, does not perform well in dynamic situations.

A slip detecting means 206 detects the amount of slip encountered by the tracks 112 of the bulldozer 104 and produces a slip signal. The slip detecting means 206 receives the ground speed signal from the ground speed sensor 202 and calculates the amount of slip by utilizing the ground speed with, for example, the output speed of a torque converter, sprocket speed, and gear selection. Algorithms for the determination of amount of slip are well known in the art and will not be discussed in greater detail.

The automatic control system 200 includes a pitch rate sensor 208 which senses the pitch rate of the bulldozer 104 and produces a pitch rate signal. The pitch rate sensor is suitably positioned on the bulldozer 104 and includes, for example, a gyroscope. The pitch of the bulldozer 104 may be determined by mathematically integrating the pitch rate signal. However sensor drift, noise and numerical computation errors make long-term integration of the pitch rate signal problematic.

A lift position sensing means 210 senses the position of lift actuator 108 and produces a lift position signal. The lift position sensing means 210 is suitably positioned on the lift actuators 108. There are several known linear position sensing devices that measure absolute position and can be used in connection with the cylinders of the lift actuators 108. For example, RF (radio frequency) sensors or LVDT (linear variable differential transformer) are both well known and suitable. In addition, the lift position sensing means 210 may be replaced by a device that measures the position of the earth moving implement 102 relative to the earth moving machine 100, such as a radar or laser plane system.

A tip position sensing means 212 senses the tilt of the blade 106 and produces a tip position signal. A relative position is calculated as a function of the amount of hydraulic fluid entering the cylinders of the hydraulic tilt actuators 110, which is a function of the flow rate of hydraulic fluid and the time over which fluid enters the cylinders of the hydraulic tilt actuators 110.

The automatic control system 200 further includes an implement position determining means 214 for determining the position of the blade 106. The implement position determining means 214 receives the slip signal from the slip detecting means 206, the pitch rate signal from the pitch rate sensor 208, the lift position signal from the lift position sensing means 210 and the tip position signal from the tip position sensing means 212, and responsively calculates the height of the blade 106 in a known manner.

The automatic control system 200 further includes a desired ground speed adjustment means 216 that adjusts a predetermined desired ground speed setting. The desired ground speed adjustment means 216 adjusts the desired ground speed as a function of the pitch signal produced by the pitch detector 204 and produces an adjusted ground speed reference signal. The adjustment is accomplished by use of look-up tables that correlate various pitch values with ground speed values to maintain the blade load as the slope of the ground changes. Such a change in adjustment is essential to optimize productivity on varying grades.

The automatic control system 200 finally includes an implement control means 218 which calculates a change in the position of the blade 106 and produces a lift actuator command signal to control the hydraulic lift actuators 108. The implement control means 218 receives the ground speed signal from the ground speed sensor 202, the adjusted ground speed reference signal from the desired ground speed adjustment means 216, the slip signal from the slip detecting means 206, and the implement position signal from the implement position determining means 214.

The present invention is directed toward estimating certain operating parameters of the bulldozer 104. Advantageously, the present invention utilizes a Kalman filter 250 to estimate the pitch and ground speed of the bulldozer 104 as a function of the sensed pitch and ground speed signals. By estimating the pitch and ground speed, the present invention overcomes the prior problems of sensing signal noise and bias. The present invention overcomes these problems by combining pitch, pitch rate and ground speed, and determining an estimate of pitch and ground speed by using a sensor measurement model, machine process model and Kalman filter update equations.

The remaining description requires a brief introduction to Kalman filtering. In general, a Kalman filter is an optimal linear least-means-squared estimator. Although not discussed, an extended Kalman filter may be used. An extended Kalman filter uses a linearized model based on the current state of a non-linear system to compute lease-means-squared estimates. While the following discussion uses "Kalman filter", it applies equally well to "extended Kalman filter". A Kalman filter is well known in the art and therefore need not be further discussed.

Figure 3:
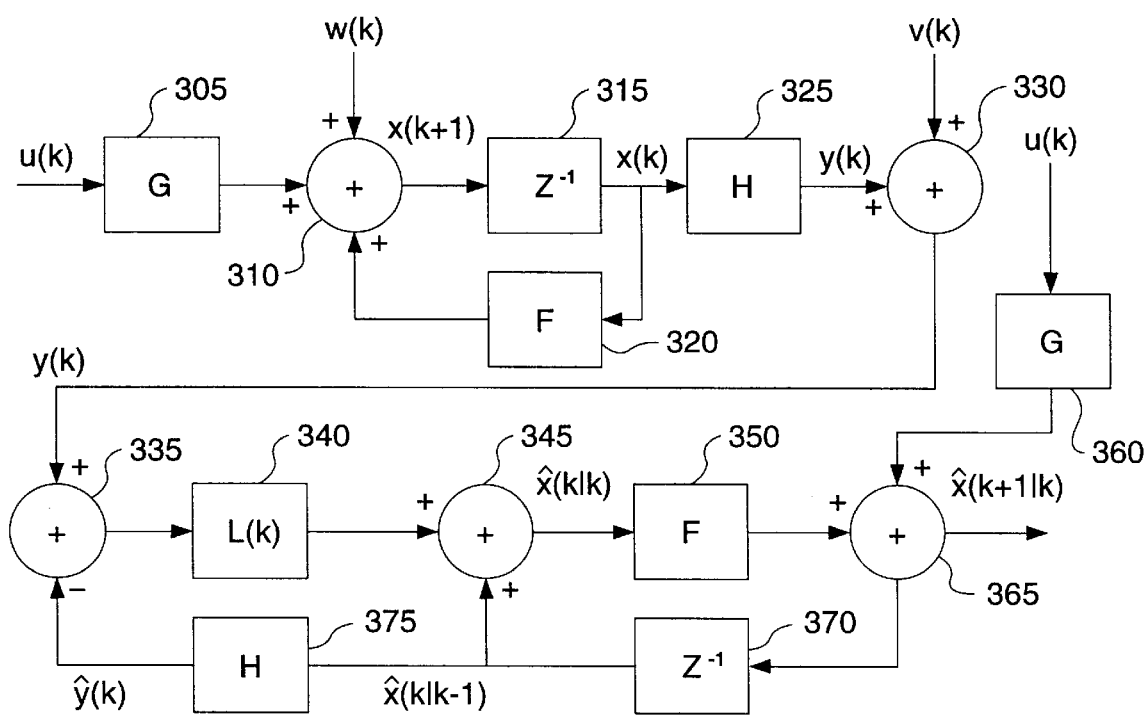
FIG. 3 illustrates a block diagram of a Kalman filter of the automatic control system.

Reference is now made to FIG. 3 which shows a block diagram of the machine process and sensor measurement dynamics and the Kalman filter dynamics. The machine process dynamics are represented by blocks 305–320, the sensor measurement dynamics are represented by blocks 325–330, and the Kalman filter dynamics are represented by blocks 335–375. As shown, an input matrix 305 receives certain process variables which are represented by, u(k). Note, all variables are described as a function of time k. The process variables preferably include ground speed or machine speed, machine acceleration, pitch, pitch rate, and pitch rate bias. The output of the input matrix 305, Gu(k), is delivered to a first summing junction 310, and is combined with a variable, w(k), which represents process noise and a variable, Fx(k), which represents the machine system dynamics. The output of the first summing junction 310 produces the machine process model, which is represented by variable, x(k+1). The process model variable is delayed by a delay matrix 315 to produce variable, x(k), which is transmitted to a system matrix 320 and an output matrix 325. The result of the output matrix 325, Hx(k), is delivered to a second summing junction 330, and is combined with a measurement noise vector, represented by variable, v(k). Preferably, the measurement noise vector includes sensed values, such as pitch, pitch rate, and ground speed. The result produces variable, y(k), which represents the output of the sensor measurement model.

Advantageously, the Kalman filter dynamics includes a measurement update, represented by blocks 335–345 and block 375, and a time update, represented by blocks 350–365. As shown, the measurement model variable, y(k), is combined with a predicted measurement variable, ŷ(k), at a third summing junction 335. The third summing junction 335 produces an error value which is amplified by a gain matrix 340. The amplified error value is then combined with a time update variable, x̂<k|k−1>, at a fourth summing junction 345 to produce a measurement update, represented by variable, x̂<k|k>. The measurement update variable is delivered to a system matrix 350, which delivers the result to a fifth summing junction 365. The fifth summing junction 365 also receives an output of an input matrix 360. The result of the fifth summing junction 365 produces a time update variable, x̂<k+1|k>. The time update variable is used to produce a ground speed estimate and a pitch estimate. The time update variable is also used in a feedback loop. As shown, the time update variable is delayed by delay matrix 370 and is delivered to an output matrix 375 to produce the predicted measurement variable, ŷ(k).

Essentially, the time update variable represents a prediction or estimate of the process variables, which also includes any inaccuracies caused by the sensor measurement or machine process. The measurement update variable represents a correction for the inaccuracies or errors to the estimate, and is used to produce the time update variable at the next instance in time.

The present invention is embodied in a microprocessor based system which utilizes arithmetic units to control process according to software programs. Typically, the programs are stored in read-only memory, random-access memory or the like. The programs are now discussed in relation to the flowchart shown in FIG. 4, which represents a preferred embodiment of the present invention. The program depicted in the flowchart is particularly well adapted for use with any conventional microprocessor based system. The flowchart constitutes a complete and workable design of the preferred software program. The software program may be readily coded from the flowchart using any conventional computer language. The process of writing software code from the flowchart is a mere mechanical step for one skilled in the art.

The start of the program begins at block 405 to which program control proceeds to block 410 where the Kalman filter parameters are initialized. After the Kalman filter parameters are initialized, the machine operating parameters, u(k),y(k), are sensed.

Control continues to blocks 420,425 where the error covariance matrix, P(k|k), of the current instant in time and Kalman gain matrix, L(k), are updated. Accordingly, the measurement update variable, x̂<k|k>, a.k.a., the estimate of x at time k based on measurements taken up to time k, is determined at block 430. Accordingly, the measurement update equations are as follows:

$$\hat{x}<k|k> = \hat{x}<k|k-1> + Lky k - H\hat{x}<k|k-1>$$

$$Lk = P<k|k>H^T R_v^{-1}$$

$$P<k|k> = P<k|k-1> - P<k|k-1>H^T HP<k|k-1>H^T + R_v^{-1} HP<k|k-1>$$

where:

x represents the process variables;
k represents a unit of time;
$R_v$ represents the measurement noise covariance matrix;
y(k) represents the output of the measurement model having the form:

$$yk = Hxk + v\, k$$

where:

H represents the output matrix; and
v represents measurement modeling and sensor errors.

Thereafter, control continues to block 435 where the error covariance matrix, P(k|k−1), of the previous instant in time is updated, and to block 440 where the time update variable or estimate, x̂<k+1|k>, is determined. The time update equations take the following form:

$$\hat{x}<k+1|k> = F\hat{x}<k|k> + Guk$$

$$P<k+1|k> = FP<k|k>F^T + R_W$$

where:

u represents the input variables;
F represents the machine system matrix;
G represents the input matrix; and
$R_W$ represents the process noise covariance matrix.

Advantageously, the ground speed and pitch estimate signals are now produced at block 445 having values equated in accordance with block 440.

Thus, while the present invention has been particularly shown and described with reference to the preferred embodiment above, it will be understood by those skilled in the art that various additional embodiments may be contemplated without departing from the spirit and scope of the present invention.

INDUSTRIAL APPLICABILITY

The present invention is directed for use with an automatic control system described herein, and is intended for use with earth moving machines, such as wheel and track/type bulldozers. It can be appreciated that by using the present invention, the automatic control 15 system 200 can use accurate measurement values that represent machine operating parameters. More particularly, the Kalman filter 250 receives spurious sensing signals representing pitch, pitch rate and ground speed, and produces estimate signals representing pitch and ground speed that better reflect the actual pitch and ground speed. Consequently, stable implement control is maintained and productivity is substantially enhanced by automatically controlling the earth moving implement 102 in response to estimated variables that are related to blade power.

Other aspects, objects and advantages of the present invention can be obtained from a study of the drawings, the disclosure and the appended claims.

We claim:

1. A method for determining pitch and ground speed of an earth moving machine, including the steps of:

determining a set of equations that model a set of operating parameters of the earth moving machine;

sensing a plurality of operating parameters on the earth moving machine including the steps of sensing the machine pitch, pitch rate, and ground speed and responsively producing a set of sensed parameter signals;

receiving the sensed parameter signals, and determining a pitch estimate and a ground speed estimate using least-means-squared estimation techniques performed by a Kalman filter in response to the sensed parameter signals and the modeling equations; and determining a machine process model at a time k, the machine process model having the following form:

$$x(k+1) = Fx(k) + Gu(k) + w(k)$$

where:

x represents process variables;
   u represents input variables;
   k represents a unit of time;
   F represents a machine system matrix;
   G represents an input matrix; and
   w represents measurement modeling and sensor errors.

2. A method, as set forth in claim 1, including the step of determining a measurement model at a time k, the measurement model having the following form:

$$y(k) = Hx(k) + v(k)$$

where:

H represents an output matrix; and
v represents sensed machine operating parameters.

3. A method, as set forth in claim 2, including the step of updating an error covariance matrix at a time k based on measurements taken up to time k, the error covariance matrix having the following form:

$$P<k|k> = P<k|k-1> - P<k|k-1>H^T(HP<k|k-1>H^T + R_v)^{-1} HP<k|k-1>$$

where:

$R_v$ represents a measurement noise covariance matrix.

4. A method, as set forth in claim 3, including the step of updating a Kalman gain matrix at a time k, the Kalman gain matrix having the following form:

$$L(k) = P<k|k>H^T R_v^{-1}.$$

5. A method, as set forth in claim 4, including the step of determining an estimate of x at a time k based on measurements taken up to time k, the estimate having the following form:

$$\hat{x}<k|k> = \hat{x}<k|k-1> + L(k)(y(k) - H\hat{x}<k|k-1>).$$

6. A method, as set forth in claim 5, including the step of updating an error covariance matrix at a time k+1, the error covariance matrix at a time k+1 having the following form:

$$P<k+1|k> = FP<k|k>F^T + R_W$$

where:

$R_w$, represents a covariance matrix.

7. A method, as set forth in claim 6, including the step of determining an extrapolation to time k+1 of the estimate of x at time k, the extrapolation having the following form:

$$\hat{x}<k+1|k>=F\hat{x}<k|k>+Gu(k)$$

wherein the pitch and ground speed estimates are determined from the extrapolation equation.

8. An apparatus for determining pitch and ground speed of an earth moving machine, comprising:

a ground speed sensor measures the ground speed of the machine and responsively produces a ground speed signal;

a pitch sensor measures the pitch of the machine and responsively produces a pitch signal;

a pitch rate sensor measures the pitch rate of the machine and responsively produces a pitch rate signal; and a Kalman filter receives the ground speed, pitch and pitch rate signals, and responsively determines a pitch estimate and a ground speed estimate using least-means-squared estimation techniques that include determining a machine process model at a time k, the machine process model having the following form:

$$x(k+1)=Fx(k)+Gu(k)+w(k)$$

where:
x represents process variables;
u represents input variables;
k represents a unit of time;
F represents a machine system matrix;
G represents an input matrix; and
represents measurement modeling and sensor errors.

9. An apparatus, as set forth in claim 8, wherein said least squares estimation techniques include determining a measurement model at a time k, the measurement model having the following form:

$$y(k)=Hx(k)+v(k)$$

where:
H represents an output matrix; and
v represents sensed machine operating parameters.

10. An apparatus, as set forth in claim 8, wherein said least squares estimation techniques include updating an error covariance matrix at a time k based on measurements taken up to time k, the error covariance matrix having the following form:

$$P<k|k>=P<k|k-1>-P<k|k-1>H^T(HP<k|k-1>H^T+R_v)^{-1}HP<k|k-1>$$

where:

$R_v$ represents a measurement noise covariance matrix.

11. An apparatus, as set forth in claim 8, wherein said least squares estimation techniques include updating a Kalman gain matrix at a time k, the Kalman gain matrix having the following form:

$$L(k)=P<k|k>H^TR_v^{-1}.$$

12. An apparatus, as set forth in claim 8, wherein said least squares estimation techniques include determining an estimate of x at a time k based on measurements taken up to time k, the estimate having the following form:

$$\hat{x}<k|k>=\hat{x}<k|k-1+L(k)(y(k)-H\hat{x}<k|k-1>).$$

13. An apparatus, as set forth in claim 8, wherein said least squares estimation techniques include updating an error covariance matrix at a time k+1, the error covariance matrix at a time k+1 having the following form:

$$P<k+1|k>=FP<k|k>F^T+R_w$$

where:

$R_w$ represents a covariance matrix.

14. An apparatus, as set forth in claim 8, wherein said least squares estimation techniques include determining an extrapolation to time k+1 of the estimate of x at time k, the extrapolation having the following form:

$$\hat{x}<k+1|k>=F\hat{x}<k|k>+Gu(k)$$

wherein the pitch and ground speed estimates are determined from the extrapolation equation.

* * * * *